United States Patent Office 3,494,758
Patented Feb. 10, 1970

---

3,494,758
WEED AND ALGAE KILLER
Erwin Otto Kopp and Karl Leonhard Milles, Munich, Bavaria, Germany, assignors to Consortium fur Elektrochemische Industrie G.m.b.H., Munich, Bavaria, Germany, a German corporation
No Drawing. Filed Mar. 7, 1967, Ser. No. 621,137
Claims priority, application Germany, Mar. 9, 1966, C 38,447
Int. Cl. A01n 9/12, 9/22, 23/00
U.S. Cl. 71—67                              1 Claim

---

ABSTRACT OF THE DISCLOSURE

This invention relates to weed and algae killers and it has for its object to provide a novel and highly effective selective preparation of this type. Specifically, the invention comprises a weed and algae killer containing 2-thiolthiazol (2-merkaptothiazol) as the active ingredient.

---

BACKGROUND OF THE INVENTION

Many herbicidal compositions have been proposed and used, often with indifferent success, for combating undesirable plant growth on highways, railroad tracks, farms, etc. Many of them, useful for one specific purpose, are ineffective in other situations.

We have discovered that 2-thiolthiazol has excellent herbicide and algicide properties. Used in small dosages, it does not cause any growth-retarding damage to graminaceae, while dicotyledonous plants are heavily affected.

SUMMARY OF THE INVENTION

Our weed and algae killer, containing 2-thiolthiazol as the active ingredient, is highly selective. It is useful, for instance, for killing weeds in grain crops. Water plants can also be controlled. For instance, dosages of 25–30 p.p.m. (parts per million) of 2-thiolthiazol are sufficient for water lentils (duckweed). Within this concentration a destruction of chlorophyll also takes place within 6 to 21 days.

The algostatic effect of 2-thiolthiazol on *Chlorella vulgaris* amounts to 5 p.p.m. Depending on the species of algae, 25–50 p.p.m. is sufficient for an algicide effect. When attacking algae and weeds in water it is important that even at 50 p.p.m. there should be no toxicity to fish life. 2-thiolthiazol is water soluble, which makes its application easier. Depending on the manner of use and the given requirements, one can add to the preparation adhesive and/or wetting agents, dispersion agents, other active substances and additives, fertilizers, floating agents diluting agents, etc.

DESCRIPTION OF PREFERRED EMBODIMENTS

The invention is illustrated by the following examples.
The preparations and the definitions 1–8 shown in the tables consisting of the following:

(1)
2-thiolthiazol (2)
50 parts 2-thiolthiazol
50 parts diethylene glycol monoethyl ether (3)
75 parts 2-thiolthiazol
10 parts sulfite lye dispersion powder
5 parts sodium metaphosphate
8 parts sodium sulfate
2 parts colloidal silicic acid (4)
50 parts 2-thiolthiazol
45 parts urea
5 parts polyvinyl alcohol (5)
40 parts 2-thiolthiazol
30 parts diethylene glycol monoethyl ether
15 parts benzene
15 parts alkylarylpolyglycol ether (6)
80 parts 2-thiolthiazol
20 parts pentachlorphenol (7)
Sodium pentachlorphenol as a comparison agent (8)
A quaternary ammonium compound with an algicide effect as a comparison agent.

EXAMPLE 1

Herbicide tests

0 = no effect
10 = plant died completely (a) Cornflower, second leaf

| Preparation as described | Kg./hectare & spray liquor/hectare | Temperature (° C.)— | | | | | |
|---|---|---|---|---|---|---|---|
| | | 3 days | | 7 days | | 14 days | |
| | | 5 | 20 | 5 | 20 | 5 | 20 |
| No. 1 | 4 kg./600/l | 3 | 10 | 10 | 10 | 10 | 10 |
| No. 2 | 4 kg./600/l | 3 | 10 | 9–10 | 10 | 10 | 10 |
| No. 3 | 4 kg./600/l | 1 | 8 | 9 | 10 | 10 | 10 |
| No. 4 | 4 kg./600/l | 3 | | 9 | | 10 | |
| No. 5 | 4 kg./600/l | 2 | | 9–10 | | 10 | |

(b) Charlock, second leaf

| Preparation as described | Kg./hectare & spray liquor/hectare | Temperature (° C.)— | | | | | |
|---|---|---|---|---|---|---|---|
| | | 3 days | | 7 days | | 14 days | |
| | | 5 | 20 | 5 | 20 | 5 | 20 |
| No. 1 | 4 kg./600/l | | 10 | 10 | 10 | 10 | 10 |
| No. 2 | 4 kg./600/l | 3 | 10 | 9–10 | 10 | 10 | 10 |
| No. 3 | 4 kg./600/l | 0 | 9 | 8 | 10 | 9 | 10 |
| No. 4 | 4 kg./600/l | 3 | | 8 | | 9 | |
| No. 5 | 4 kg./600/l | 4 | | 9–10 | | 10 | |

(c) Galinsolga, fourth leaf

| Preparation as described | Kg./hectare & spray liquor/hectare | Temperature (° C.)— | | | | | |
|---|---|---|---|---|---|---|---|
| | | 3 days | | 7 days | | 14 days | |
| | | 5 | 20 | 5 | 20 | 5 | 20 |
| No. 6 | 4 kg./600/l | | 8 | | 10 | | 10 |

(d) Winter wheat, 3rd leaf

| Preparation as described | Kg./hectare & spray liquor/hectare | Temperature (° C.)— | | | | | |
|---|---|---|---|---|---|---|---|
| | | 3 days | | 7 days | | 14 days | |
| | | 5 | 20 | 5 | 20 | 5 | 20 |
| No. 1 | 4 kg./600/l | | 1 | | 1 | | 1 |
| No. 2 | 4 kg./600/l | 0 | 0 | 1 | 0 | 0 | 0 |
| No. 3 | 4 kg./600/l | 0 | 1 | 1–2 | 3 | 3 | 3 |
| No. 4 | 4 kg./600/l | 1 | 1 | 4 | 3 | 3 | 3 |
| No. 5 | 4 kg./600/l | 1 | 0 | 4 | 0 | 4 | 0 |

(e) Hair grass, 10 cm. high

| Preparation as described | Kg./hectare & spray liquor/hectare | Temperature (° C.)— | | | | | |
|---|---|---|---|---|---|---|---|
| | | 3 days | | 7 days | | 14 days | |
| | | 5 | 20 | 5 | 20 | 5 | 20 |
| No. 4 | 20 kg./600/l | 3 | | 3 | | 3 | |
| No. 5 | 20 kg./600/l | 1 | | 2 | | 2 | |

Examples (d) and (e) above show that even under high dosages there is little damage to graminaceae.

(f) 6 kg. hectare of thiolthiazol were applied as an 82% spray powder (15% sodium pyrophosphate, 3% finely dispersed silicon dioxide) and with 600 liters per hectare. At temperatures of 4–6° C. the following results were achieved on hard to control weeds (not tests):

|  | After 8 days | After 14 days |
|---|---|---|
| Chickweed (Stellaria media) | 9 | 9 |
| Catchweed (Galium aparine) | 1 | 9 |
| Ivy-leafed speedwell (Veronic hederaefolia) | 10 | 10 |

EXAMPLE 2

Chlorophyl reduction on duckweed (Lemna)

0 = no reduction
10 = complete reduction (discoloration)

| Preparation as described | Reduction after 14 days | 10 p.p.m. after 21 days | Reduction after 14 days | 25 p.p.m. after 21 days |
|---|---|---|---|---|
| No. 1 | 4 | 6 | 9 | 9–10 |
| No. 2 | 8 | 10 | 10 | 10 |
| No. 8 for comparison | 2 | 3 | 5 | 5 |

EXAMPLE 3

*Cholorella vulgaris.*—Algostatic and algicide effect

| Preparation as described | algostatic effect after— | | | algicide effect after— | | |
|---|---|---|---|---|---|---|
| | 7 days, p.p.m. | 14 days, p.p.m. | 21 days, p.p.m. | 7 days, p.p.m. | 14 days, p.p.m. | 21 days, p.p.m. |
| No. 1 | 3 | 5 | 5 | 20 | 10 | 25 |
| No. 2 | 5 | 20 | 30 | 20 | 20 | 30 |
| No. 7 for comparison | 20 | 25 | 25 | 50 | 33 | 33 |

The invention claimed is:
1. Method of combating weeds and algae which comprises applying to said weeds and algae an effective amount of 2-thiolthiazol.

References Cited

UNITED STATES PATENTS 2,845,339   7/1958   Bluestone _____ 71—90
2,860,962   11/1958  Bluestone _____ 71—90 X

OTHER REFERENCES

Ballis, Chemical Abstract, vol. 45, col. 3902(i) 1951.

JAMES O. THOMAS, JR., Primary Examiner

U.S. Cl. X.R.
71—90